United States Patent
Shriya et al.

(10) Patent No.: US 9,559,737 B2
(45) Date of Patent: Jan. 31, 2017

(54) TELECOMMUNICATIONS CHIP CARD

(71) Applicant: Morpho Cards GmbH, Flintbek (DE)

(72) Inventors: Sanjeev Shriya, New Delhi (IN); Vikas Phogat, New Delhi (IN)

(73) Assignee: Morpho Cards GmbH, Flintbek (DE)

( * ) Notice: Subject to any disclaimer, the term of this patent is extended or adjusted under 35 U.S.C. 154(b) by 0 days.

(21) Appl. No.: 14/438,717

(22) PCT Filed: Oct. 29, 2013

(86) PCT No.: PCT/EP2013/072571
§ 371 (c)(1),
(2) Date: Apr. 27, 2015

(87) PCT Pub. No.: WO2014/067925
PCT Pub. Date: May 8, 2014

(65) Prior Publication Data
US 2015/0303964 A1 Oct. 22, 2015

(30) Foreign Application Priority Data

Nov. 2, 2012 (EP) .................................... 12191036

(51) Int. Cl.
*H04B 1/38* (2015.01)
*H04L 29/06* (2006.01)
(Continued)

(52) U.S. Cl.
CPC ......... *H04B 1/3816* (2013.01); *H04L 63/0861* (2013.01); *H04L 63/0869* (2013.01);
(Continued)

(58) Field of Classification Search
CPC ............... H04B 1/3816; H04L 63/0876; H04L 63/0869; H04L 63/0861; H04L 65/0853; H04W 4/001; H04W 4/003; H04W 84/042; H04W 12/06; H04W 88/08; H04W 8/265
See application file for complete search history.

(56) References Cited

U.S. PATENT DOCUMENTS 8,555,067 B2 * 10/2013 Schell ................. H04L 63/0853
713/169
8,688,076 B2 * 4/2014 Helmreich .......... H04L 63/0853
455/410
(Continued)

FOREIGN PATENT DOCUMENTS

| EP | 1483935 | 12/2004 |
|---|---|---|
| EP | 2337307 | 6/2011 |
| EP | 2448216 | 5/2012 |

OTHER PUBLICATIONS

International Search Report and Written Opinion dated Jan. 28, 2014 in related International Application No. PCT/EP2013/072571 (9 pages).

*Primary Examiner* — Brandon Miller

(57) ABSTRACT

The invention provides for a telecommunications chip card for logging into a mobile a digital cellular mobile telecommunications network (107). The telecommunications chip card comprises a chip card reader interface for communicating with a mobile telephone device, a chip card processor means, and a secure memory means (302) for storing programs for execution by the chip card processor means. The secure memory means contains a program (304). The program causes the chip card processor means to: perform (200) a first cryptographic mutual authentication between the telecommunications chip card and a terminal device (502), receive (214) a configuration message (400, 402, 404, 406, 408, 410, 524) via the chip card reader interface, store the (216) configuration message in the secure memory means, and delete (218) the program from the secure memory means.

13 Claims, 12 Drawing Sheets

(51) Int. Cl.
*H04W 4/00* (2009.01)
*H04W 8/26* (2009.01)
*H04W 84/04* (2009.01)
*H04W 88/02* (2009.01)
*H04W 12/06* (2009.01)
*H04B 1/3816* (2015.01)

(52) U.S. Cl.
CPC ......... *H04L 63/0876* (2013.01); *H04W 4/001* (2013.01); *H04L 63/0853* (2013.01); *H04W 4/003* (2013.01); *H04W 8/265* (2013.01); *H04W 12/06* (2013.01); *H04W 84/042* (2013.01); *H04W 88/02* (2013.01)

(56) References Cited

U.S. PATENT DOCUMENTS

| | | | | |
|---|---|---|---|---|
| 2003/0008681 A1* | 1/2003 | Miethe | ............... | H04N 7/17318 455/557 |
| 2005/0235143 A1* | 10/2005 | Kelly | ............... | G06F 21/10 713/165 |
| 2006/0111147 A1* | 5/2006 | Lan | ............... | H04M 1/72525 455/558 |
| 2006/0183500 A1* | 8/2006 | Choi | ............... | H04W 8/265 455/558 |
| 2013/0303122 A1* | 11/2013 | Li | ............... | H04W 8/20 455/411 |

* cited by examiner

TELECOMMUNICATIONS CHIP CARD

The present application claims the benefit of priority to PCT International Application No. PCT/EP13/72571 filed 29 Oct. 2013, which claims the benefit of priority to EP12191036.8 filed 2 Nov. 2012; each of which is incorporated herein by reference in its entirety.

FIELD OF THE INVENTION

Mobile telephone devices are ubiquitous in today's society. Many individuals carry at least one mobile telephone device, typically a cellular telephone. Many other mobile telephone devices such as netbook computers or tablet computers are also commonly carried and used. While user may communicate using a mobile telephone using a variety of different modality. For instance a user may send an SMS, download a web page, send or receive email, and/or make a voice telephone call.

Typically mobile telephone devices are adapted for receiving a telecommunications chip card which provides the data and authorization necessary to log into a digital cellular mobile telecommunications network. The telecommunications chip card may be moved from one mobile telephone device into another.

In some markets individuals may use the same telecommunications chip card for years. In other markets, such as in the developing world, telecommunications chip cards are used for a short period of time and discarded. Because of this the operator of the digital cellular mobile telecommunications network may constantly configure and enable large numbers of telecommunications chip cards to replace those that are discarded. The operator of digital cellular mobile telecommunications network may also change the configuration options and data included on the telecommunications chip cards often.

BACKGROUND AND RELATED ART

Mobile telephone devices are used by individuals to communicate in

SUMMARY

The invention provides for a telecommunications chip card, an update system, and a method of configuring a telecommunications chip card in the independent claims. Embodiments are given in the dependent claims.

As will be appreciated by one skilled in the art, aspects of the present invention may be embodied as a apparatus, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer executable code embodied thereon.

Any combination of one or more computer readable medium(s) may be utilized. The computer readable medium may be a computer readable signal medium or a computer readable storage medium. A 'computer-readable storage medium' as used herein encompasses any tangible storage medium which may store instructions which are executable by a processor of a computing device. The computer-readable storage medium may be referred to as a computer-readable non-transitory storage medium. The computer-readable storage medium may also be referred to as a tangible computer readable medium. In some embodiments, a computer-readable storage medium may also be able to store data which is able to be accessed by the processor of the computing device. Examples of computer-readable storage media include, but are not limited to: a floppy disk, a magnetic hard disk drive, a solid state hard disk, flash memory, a USB thumb drive, Random Access Memory (RAM), Read Only Memory (ROM), an optical disk, a magneto-optical disk, and the register file of the processor. Examples of optical disks include Compact Disks (CD) and Digital Versatile Disks (DVD), for example CD-ROM, CD-RW, CD-R, DVD-ROM, DVD-RW, or DVD-R disks. The term computer readable-storage medium also refers to various types of recording media capable of being accessed by the computer device via a network or communication link. For example a data may be retrieved over a modem, over the Internet, or over a local area network. Computer executable code embodied on a computer readable medium may be transmitted using any appropriate medium, including but not limited to wireless, wireline, optical fiber cable, RF, etc., or any suitable combination of the foregoing.

A computer readable signal medium may include a propagated data signal with computer executable code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

'Computer memory,' 'memory,' or 'memory means' is an example of a computer-readable storage medium. Computer memory is any memory which is directly accessible to a processor. 'Computer storage' or 'storage' is a further example of a computer-readable storage medium. Computer storage is any non-volatile computer-readable storage medium. In some embodiments computer storage may also be computer memory or vice versa.

A 'processor' or 'processor means' as used herein encompasses an electronic component which is able to execute a program or machine executable instruction or computer executable code. References to the computing device comprising "a processor" should be interpreted as possibly containing more than one processor or processing core. The processor may for instance be a multi-core processor. A processor may also refer to a collection of processors within a single computer system or distributed amongst multiple computer systems. The term computing device should also be interpreted to possibly refer to a collection or network of computing devices each comprising a processor or processors. The computer executable code or program may be executed by multiple processors that may be within the same computing device or which may even be distributed across multiple computing devices.

Computer executable code may comprise machine executable instructions or a program which causes a processor to perform an aspect of the present invention. Computer executable code for carrying out operations for aspects of the present invention may be written in any combination of one or more programming languages, including an object oriented programming language such as Java, Smalltalk, C++ or the like and conventional procedural programming languages, such as the "C" programming language or similar programming languages and compiled into machine executable instructions. In some instances the computer executable code may be in the form of a high level language or in a pre-compiled form and be used in conjunction with an interpreter which generates the machine executable instructions on the fly.

The computer executable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block or a portion of the blocks of the flowchart, illustrations, and/or block diagrams, can be implemented by computer program instructions in form of computer executable code when applicable. It is further under stood that, when not mutually exclusive, combinations of blocks in different flowcharts, illustrations, and/or block diagrams may be combined. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

A 'user interface' as used herein is an interface which allows a user or operator to interact with a computer or computer system. A 'user interface' may also be referred to as a 'human interface device.' A user interface may provide information or data to the operator and/or receive information or data from the operator. A user interface may enable input from an operator to be received by the computer and may provide output to the user from the computer. In other words, the user interface may allow an operator to control or manipulate a computer and the interface may allow the computer indicate the effects of the operator's control or manipulation. The display of data or information on a display or a graphical user interface is an example of providing information to an operator. The receiving of data through a keyboard, mouse, trackball, touchpad, pointing stick, graphics tablet, joystick, gamepad, webcam, headset, gear sticks, steering wheel, pedals, wired glove, dance pad, remote control, and accelerometer are all examples of user interface components which enable the receiving of information or data from an operator.

A 'telecommunications chip card' as used herein is a chip card which enables the login of a mobile telephone device into a digital cellular mobile telecommunications network. For example a telecommunications chip card may be a subscriber identity module (SIM) which securely stores a service-subscriber key which is used to identify the subscriber on the digital cellular mobile telecommunications network.

A 'mobile telephone device' as used herein is a mobile communication device adapted for connecting to and providing access to a digital cellular mobile telecommunications network. Examples of a mobile telephone device include, but are not limited to: a mobile telephone, a personal digital assistant, a pager, a cellular modem for a computer, a netbook computer, a notebook computer, a tablet computer, and an electronic book or document reader.

In one aspect the invention provides for a telecommunications chip card for enabling the log in of a mobile telephone device into a digital cellular mobile telecommunications network. The telecommunications chip card comprises a chip card reader interface adapted for enabling communication between the telecommunications chip card and the mobile telephone device. The chip card reader interface may alternatively or also be used for enabling communication between the telecommunications chip card and a terminal device for programming or updating the telecommunications chip card. The telecommunications chip card further comprises a chip card processor means. The chip card processor may also simply be a processor or chip card processor in some embodiments. The telecommunications chip card further comprises a secure memory means or a secure memory for storing programs for execution by the chip card processor means. The secure memory means is a memory means or memory which is not accessible directly via the chip card reader interface.

The chip card processor means is able to communicate via the chip card reader interface and the chip card processor means itself may add or delete the contents of the secure memory means. The telecommunications chip card further comprises a program stored in the secure memory means. The program comprises machine-readable instructions executable by the chip card processor means. Execution of the program causes the chip card processor means to perform a first cryptographic mutual authentication between the telecommunications chip card and a terminal device via the chip card reader interface. The terminal device has a chip card reader operable for connecting to the chip card reader interface. A cryptographic mutual authentication as used herein encompasses an algorithm where cryptographic methods are used for two devices to authenticate the identity or validity of each other. A cryptographic mutual authentication may also involve a key exchange or a validation of cryptographic keys.

Execution of the program further causes the chip card processor means to receive a configuration message via the chip card reader interface. Execution of the program further causes the chip card processor means to store the configuration message in the secure memory means. Execution of the program further causes the chip card processor means to delete the program from the memory means. For instance the program could be loaded into a memory within the chip card processor means and after execution of the program it deletes itself. Alternatively the program could have a small sub-program or portion of executable instructions which can be loaded into the chip card processor means and causes the program to be deleted from the memory means. This embodiment may be beneficial because it provides a means of customizing the telecommunications chip card before installation into the mobile telephone device. Deleting the program from the memory means may be beneficial because it eliminates the threat of a hacker or other individual using the program to clone the telecommunications chip card or modify its contents. The telecommunications chip card can be modified only once using this technique. This provides a high level of security while allowing for a complete customization of the telecommunications chip card.

In another embodiment execution of the instructions further cause the chip card processor means to perform any one of the following: perform a MAC authentication of the configuration message, verify the digital signature of the configuration message, decrypt the configuration message, and combinations thereof. For instance the program may contain cryptographic keys which enable the decryption of an encrypted configuration message. This provides an additional layer of security. For instance if the configuration message is encrypted and it is decrypted by the program then this assures the manufacturer of the telecommunications chip card that the configuration message can be placed on the chip card in a secure memory securely. For instance the telecommunications chip cards can be distributed and provided to a resale point. For instance the telecommunications chip card can be distributed to a resale point and the resale point can be provided with a terminal device for interfacing with the chip card reader interface. The resale point need not have any of the keys necessary for encrypting or decrypting the configuration message. The configuration message can be generated by a central server and then sent via the terminal device to the telecommunications chip card which then decrypts the message. As long as the central server does not become compromised the decryption of the configuration message can ensure that the configuration message is authentic and unaltered.

In another embodiment the configuration message is any one of the following: a set of telephone numbers, subscriber information, an operating system, advertisement data, an application, and combinations thereof. In other words the contents of the secure memory means can be customized completely. The configuration message may be data or information which may be written directly into the secure memory means by the processor. The subscriber information as used herein encompasses data or keys or information which is used by a mobile telephone device to log into a mobile telecommunications network.

In another embodiment execution of the instructions causes the chip card processor means to erase the secure memory means before storing the configuration message in the secure memory means. This embodiment provides an even higher level of security because the entire contents of the secure memory means have been erased. This reduces the chance of code remaining on the chip card processor means which can be exploited to identify or take control of the telecommunications chip card. This reduces the chance that the telecommunications chip card may be hacked.

In another embodiment the telecommunications chip card comprises an internal memory within the chip card processor means. Within the internal memory a portion or the entire program may be loaded into the chip card and used. This internal memory is a volatile memory so that anything stored in it is not stored permanently.

In another embodiment the secure memory means is a non-volatile memory means. In other words the data and information stored in the secure memory means is persistent and remains even if power is removed from the telecommunications chip card.

In another aspect the invention provides for an update system for modifying the telecommunications chip card. The telecommunications chip card is according to an embodiment of the invention. The update system comprises a terminal device. The terminal device comprises a chip card reader operable for receiving the telecommunications chip card and for data exchange with the chip card reader interface. Essentially the telecommunications chip card is able to be inserted into the chip card reader such that the update system can exchange data with it. The terminal device further comprises a terminal device processor means. The terminal device processor means may also be a terminal device processor or simply a processor as defined earlier.

The terminal device further comprises a terminal memory means or terminal memory for storing a terminal means program. The terminal memory means may be a computer memory as defined herein. Execution of the terminal means program causes the terminal processor means to perform a first cryptographic mutual authentication between the terminal device and the telecommunications chip card via the chip card reader interface. Execution of the terminal means program further causes the terminal processor means to perform a second cryptographic mutual authentication between the terminal device and a server. For instance the terminal device may be connected to a server via any number of telecommunications networks or communication modes since the terminal device may be connected via a digital cellular mobile telecommunications network or via the Internet. The server may be a central server which is used for generating the configuration method.

Execution of the terminal means program further causes the terminal processor means to send a cryptographic security token to the server. In some embodiments the cryptographic security token is an identifier which identifies a subscriber. Execution of the instructions further causes the processor to request a cryptographic server message from the server. In some embodiments the server may select the cryptographic server message using the cryptographic security token. The cryptographic server message may also be in some embodiments personalized depending upon the cryptographic security token. For instance if the cryptographic security token identifies a subscriber, subscriber data which links the log in of the mobile telephone device to an account of the subscriber may be included in the cryptographic server message.

Execution of the terminal means program further causes the terminal processor means to receive a cryptographic server message from the server. Execution of the terminal means program further causes the terminal processor means to decrypt the cryptographic server message using a cryptographic key. In various embodiments this may be performed in different ways. In some embodiments the decryption may be performed on the fly and the decrypted message may be written directly into the security memory means. In other embodiments the entire cryptographic server message is received and then it is later decrypted.

Execution of the terminal means program further causes the terminal processor means to construct a configuration message using the decrypted cryptographic server message. In some embodiments the configuration message is an unencrypted message which is stored directly on the secure memory means. In other embodiments the configuration message may be encrypted. For instance the cryptographic server message may be encrypted twice. The server sends the cryptographic server message to the terminal device which then decrypts it. This ensures that only the specific terminal device can receive and use the cryptographic server message. Next the decrypted cryptographic server message is in fact an encrypted configuration message. This encrypted configuration message is then transferred from the terminal device to the telecommunications chip card where it is finally decrypted and placed into the secure memory. Execution of the terminal means program further causes the terminal processor means to send the configuration message to the telecommunications chip card via the chip card reader interface.

In another embodiment the terminal device comprises a fingerprint reader for scanning a fingerprint from an operator.

In another embodiment the terminal device comprises a biometric measurement means for measuring a biometric parameter of a subscriber.

In another embodiment the terminal device further comprises a stored fingerprint record in the terminal device memory means. Execution of the terminal means program further causes the terminal processor to verify the fingerprint by comparing the fingerprint to the fingerprint record. Execution of the terminal means program further causes the terminal processor means to abort requesting the cryptographic server message unless the fingerprint is verified. This embodiment may be used to secure that only the intended operator of the terminal device is able to load the configuration message onto the telecommunications chip card. The fingerprint record could be a fingerprint of a person operating the terminal device at a resale point. In other embodiments the fingerprint record could be transferred for instance via encryption from the server to the terminal device. A subscriber would then scan his or her fingerprint on the fingerprint reader and this would be compared. This would ensure that the subscriber is actually present when the updating of the telecommunications chip card is performed.

In another embodiment the security token comprises the fingerprint.

In another embodiment the security token comprises the biometric parameter measured by the biometric measurement device.

In another embodiment the update system further comprises a smartcard reader operable for interfacing with a smartcard. Execution of the terminal means program further causes the terminal memory means to perform a cryptographic validation of the smartcard. Execution of the terminal means program further causes the terminal processor means to abort requesting the cryptographic server message unless the smartcard is validated.

In another embodiment the smartcard comprises or contains a smartcard memory containing an identity token. The identity token comprises any one of the following: stored fingerprint data, biometric data, iris scan data, cryptographic authentication, cryptographic keys or key pairs, and combinations thereof. Execution of the terminal means program further causes the terminal processor means to retrieve an identity token from the smartcard memory via the smartcard reader. The security token comprises the identity token.

In another embodiment the terminal device further comprises a user interface. Execution of the instructions further causes the terminal processor to receive user data from the user interface. The security token comprises the user data. For instance the user data could be a personal identification number or it could also be some sort of other user identification or password. This may be beneficial for linking the configuration message to an account of a subscriber.

In another embodiment the update system comprises the server.

In another aspect the invention provides for a method of configuring a telecommunications chip card using an update system. The telecommunications chip card comprises a chip card reader interface adapted for allowing communication between the telecommunications chip card and the mobile telephone device. The telecommunications chip card further comprises a chip card processor means. The telecommunications chip card further comprises a secure memory means for storing programs for execution by the chip card processor means. The telecommunications chip card further comprises a program stored in the secure means comprising machine-readable instructions executable by the chip card processor means. The update system comprises a terminal device. The terminal device comprises a chip card reader operable for receiving the telecommunications chip card and for exchanging data with the chip card reader interface. The terminal device comprises a terminal device processor means. The method comprises the step of performing a first cryptographic mutual authentication between the terminal device and the telecommunications chip card using the chip card reader interface.

The terminal device processor means and the chip card processor means perform this. The method further comprises the step of performing a second cryptographic mutual authentication between the terminal device and a server. The method further comprises the step of sending the cryptographic security token from the terminal device to the server. The method further comprises the step of sending a cryptographic server message request from the terminal device to the server. The method further comprises the step of sending the cryptographic server message from the server to the terminal device. The method further comprises the step of decrypting the cryptographic server message using the cryptographic key. The method further comprises the step of constructing a configuration message using the decrypted cryptographic server message. The method further comprises the step of sending the configuration message from the terminal device to the telecommunications chip card. The method further comprises the step of storing the configuration message in the secure memory means. The method further comprises the step of deleting the program from the memory means.

In another embodiment the method further comprises identifying the subscriber using the cryptographic security token. This may be performed by the server. In another embodiment the security token comprises a biometric identifier such as a fingerprint or an iris scan. The subscriber is identified by comparing the biometric identifier to a biometric database.

It is understood that one or more of the aforementioned embodiments of the invention may be combined as long as the combined embodiments are not mutually exclusive.

BRIEF DESCRIPTION OF THE DRAWINGS

In the following embodiments of the invention are explained in greater detail, by way of example only, making reference to the drawings in which.

DETAILED DESCRIPTION

Like numbered elements in these figures are either equivalent elements or perform the same function. Elements which have been discussed previously will not necessarily be discussed in later figures if the function is equivalent.

Figure 1:
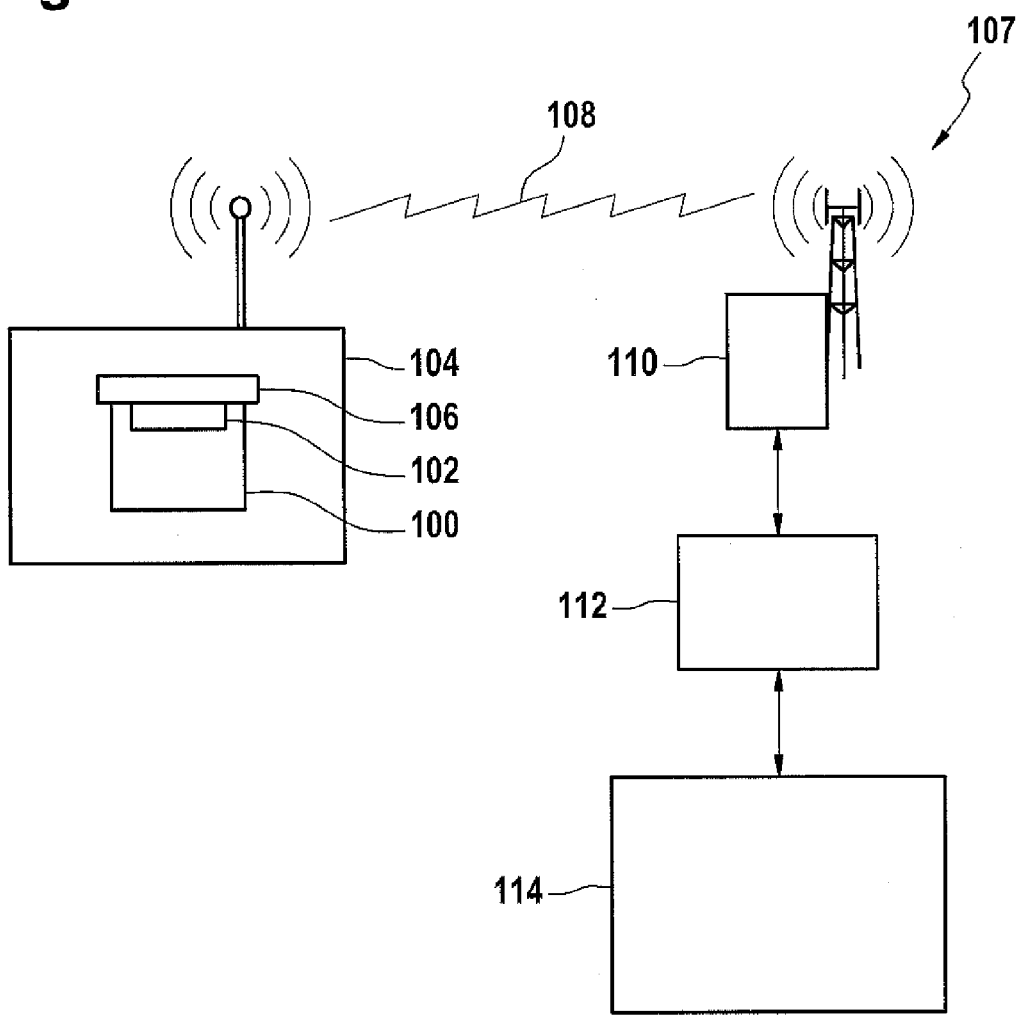
FIG. 1 illustrates the use of a telecommunications chip card.

FIG. 1 illustrates the use of a telecommunications chip card 100. The telecommunications chip card 100 is shown as having a chip card reader interface 102. The telecommunications chip card 100 has been inserted into a mobile telephone device 104. The mobile telephone device 104 comprises a chip card reader 106 which connects to the chip card reader interface. The telecommunications chip card 100 enables the mobile telephone device 104 to log into and communicate with a digital cellular mobile telecommunications network 107. The mobile telephone device 104 has a radio link 108 to the digital cellular mobile telecommunications network 107. For example the digital cellular mobile telecommunications network 107 may comprise a base station 110. The base station is operable for connecting to the mobile telephone device 104 via the radio link 108. The base station 110 is connected to a radio network controller 112. The radio network controller 112 is then connected to a telecommunications network 114. The digital cellular mobile telecommunications network 107 may therefore provide access to other telecommunications networks such as the Internet, the global telephone voice network, or other communications networks 114.

Figure 2:
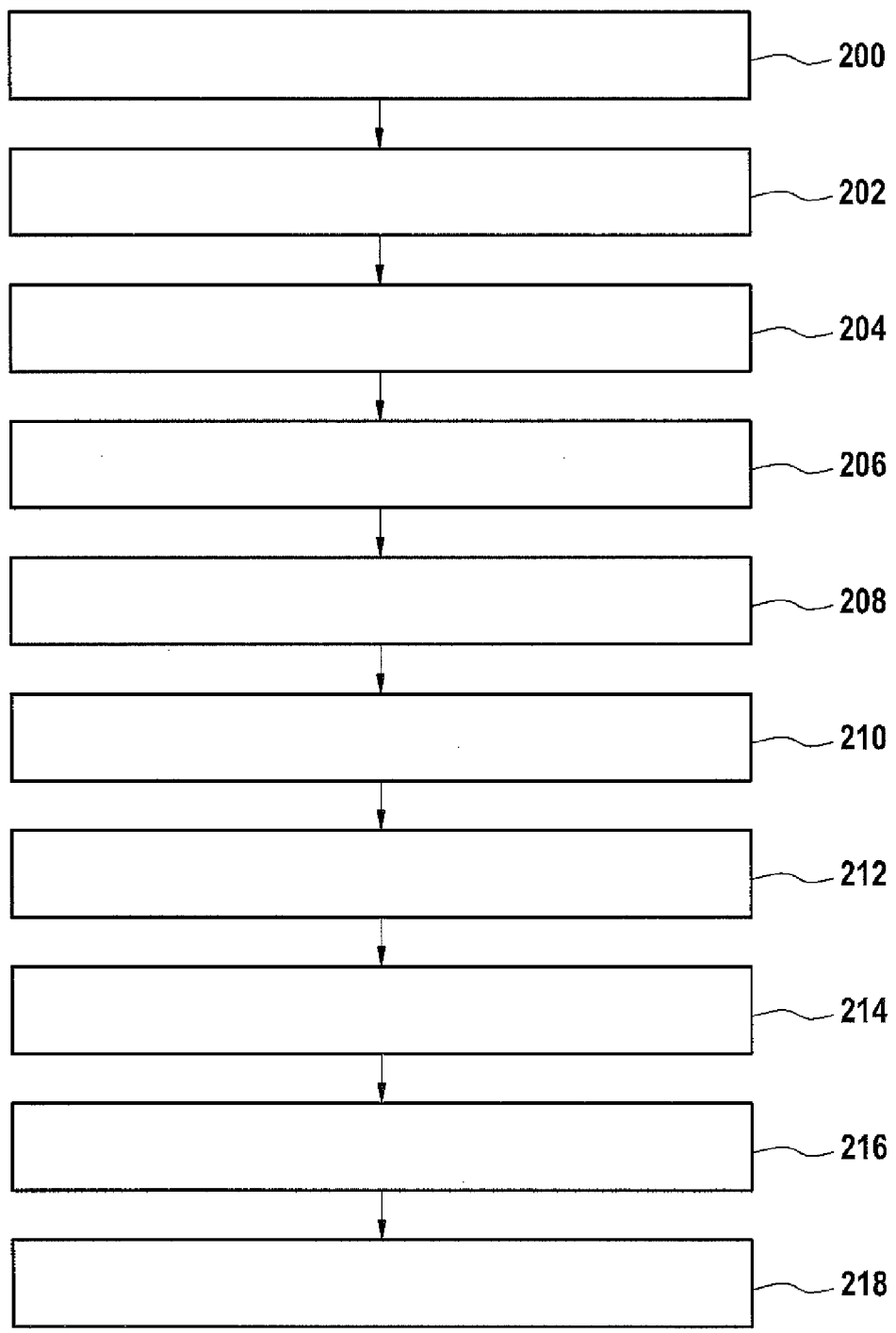
FIG. 2 illustrates a method according to an embodiment of the invention.

FIG. 2 illustrates a method according to an embodiment of the invention. First in step 200 a first cryptographic mutual authentication is performed between a terminal device and a telecommunications chip card using a chip card reader interface. Next in step 202 a second cryptographic mutual authentication is performed between the terminal device and a server. Steps 202 and 200 may be performed in any order. Next in step 204 a cryptographic security token is sent from the terminal device to the server. Next in step 206 a cryptographic server message request is sent from the terminal device to the server. Next in step 208 a cryptographic server message is sent from the server to the terminal device. Next in step 210 the cryptographic server message is decrypted using a cryptographic key. In step 212 a configuration message is constructed using the decrypted cryptographic server message. In some embodiments the construction of the configuration message may simply be by providing the decrypted cryptographic server message. Next in step 214 the configuration message is sent from the terminal device to the telecommunications chip card. Next in step 216 the configuration message is stored in the secure memory means. In some embodiments there is an additional step of decrypting the configuration message. Next in step 218 a program which was operating on the telecommunications chip card is deleted. The program was operable for storing the configuration message in the secure memory means.

Figure 3:
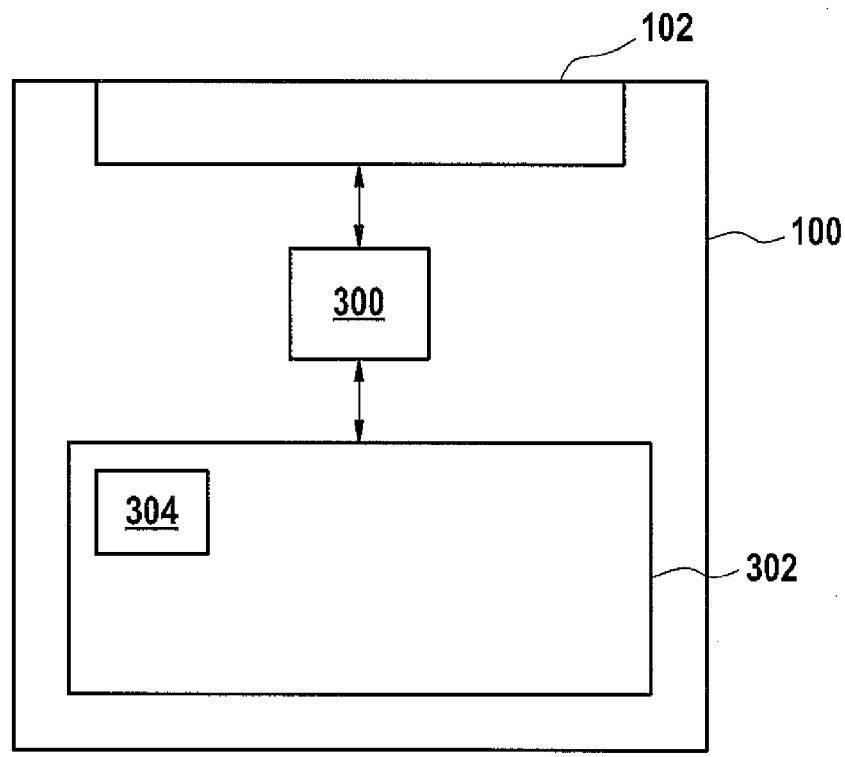
FIG. 3 illustrates a telecommunications chip card 100 before modification by an update system.

FIG. 3 illustrates a telecommunications chip card 100. The telecommunications chip card 100 shown in FIG. 3 is before it has been modified by an update system. The telecommunications chip card 100 shows the chip card reader interface 102 connected to a chip card processor means 300. The chip card processor means 300 has access to a secure memory means 302. The secure memory means 302 contains a program 304 according to an embodiment. This program 304 is operable for performing the first cryptographic mutual authentication between the telecommunications chip card and the terminal device via the chip card reader interface. The program 304 is further operable to receive a configuration message via the chip card reader interface. The program 304 is further operable to store the configuration message in the secure memory means 302 and the program is operable to delete itself 304 from the secure memory means 302. The program 304 may also have cryptographic modules and/or key pairs for decrypting the configuration method in some embodiments.

Figure 4:
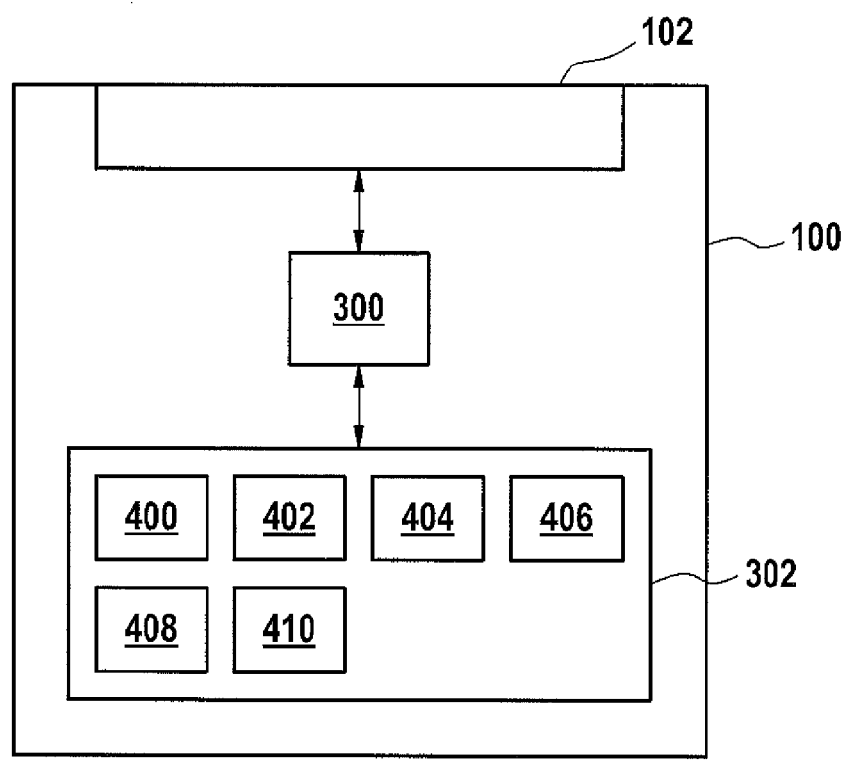
FIG. 4 shows the same telecommunications chip card as was shown in FIG. 3 after modification by an update system.

FIG. 4 shows the same telecommunications chip card 100 as was shown in FIG. 3. However, in this example the configuration message 400, 402, 404, 406, 408, 410 has been written into the secure memory means 302 and the program 304 of FIG. 3 has been deleted. It can be seen that in this example the secure memory means 302 contains subscriber information 400. The subscriber information as used herein is data information which enables the mobile telephone device to log into the digital cellular mobile telecommunications network. The secure memory means 302 is shown as further containing telephone numbers 402. The telephone numbers may for instance be subscriber numbers or other numbers which the provider of the digital mobile telecommunications network would like the operator of the mobile telephone device to have access to when the telecommunications chip card 100 is inserted into a mobile telephone device.

The secure memory means 302 is shown as further containing an operating system 404. The secure memory means 302 is shown as further containing an advertisement 406 or advertisement data. The secure memory means 302 is further shown as containing a first application 408 and a second application 410. These are applications which may be executed by the chip card processor means 300 and perform a useful function. For instance the first and second applications 408, 410 may use such things as the advertisement data 406 to display or present advertisements to an operator of the mobile telephone device. The contents of the secure memory means 302 may vary. Not all contents of the secure memory means 302 need be present.

Figure 5:
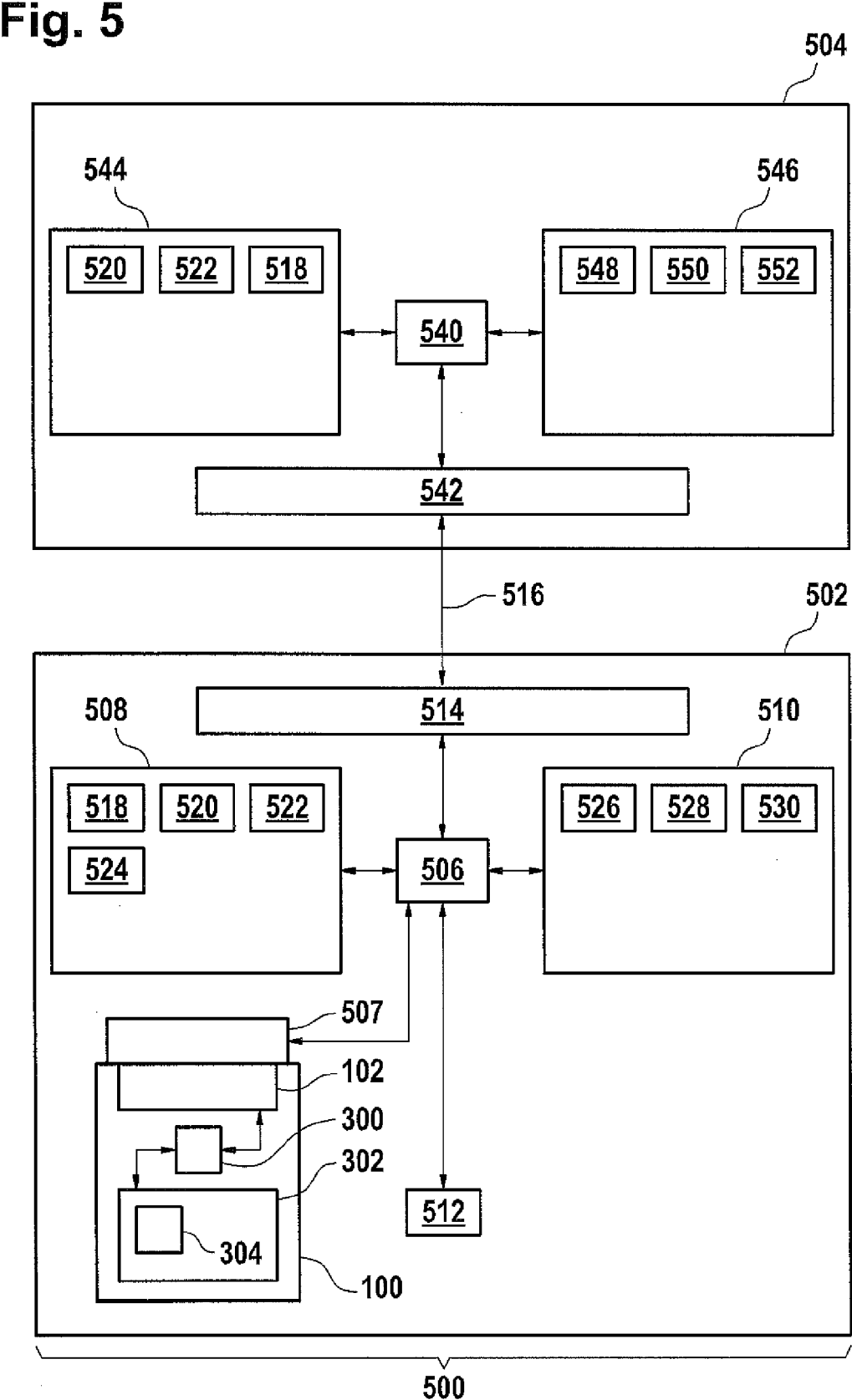
FIG. 5 shows an update system according to an embodiment of the invention.

FIG. 5 shows an update system 500 according to an embodiment of the invention. The update system 500 comprises a terminal device 502 optionally connected to a server 504. The terminal device 502 comprises a terminal device processor means 506. The terminal device processor means is connected to a chip card reader 507. The chip card reader 507 is operable for interfacing with a chip card reader interface 102 of telecommunications chip card 100. The terminal device processor means 506 is further connected to a computer storage means 508 and a computer memory means 510. The terminal device processor means 506 is further connected to a cryptographic module means 512. The cryptographic module means 512 may be implemented as a software module or a hardware module and provides cryptographic data for authenticating the terminal device and/or for providing key pairs for decryption and encryption of messages. As mentioned before the cryptographic module means 512 may be a software module stored in the computer storage 508 or memory 510 or it may be an individual security token such as a trusted computing platform module or a hardware device which securely stores biometric data and/or cryptographic keys or key pairs.

The terminal device processor means 506 is further connected to a network communication means 514. The network communication means 514 enables the formation of a network connection 516 to the server 504. Network connection 516 is representative and is intended to represent a variety of different network connections such as an internet, Ethernet, or digital mobile telecommunications network connection. For instance in some cases the terminal device 502 may be a smartphone or a specialized smartphone instead of being simply a computer. The terminal device 502 may in some instances by a mobile computing device.

The computer storage means 508 is shown as containing a security token 518. The computer storage means 508 is further shown as containing a cryptographic server message request 520. The computer storage means 508 is further shown as containing a cryptographic server message 522. The computer storage means 508 is further shown as containing a configuration message 524 which will be transferred via the chip card reader 507 to the telecommunications chip card 100.

The computer memory means 510 are shown as containing a control module 526. The control module 526 contains processor executable code which enables the processor means 506 to communicate with the server 504 and the telecommunications chip card 100. The computer memory means 510 is further shown as containing a cryptographic module 530. The cryptographic mutual authentication module 528 and the cryptographic module 530 contain code which enables the processor means 506 to perform the authentication and encryption and decryption necessary for transferring the cryptographic server message 522 and transforming it into the configuration message 524 which is then transmitted to the telecommunications chip card 100.

The server 504 is shown as containing a server processor means 540. The server processor means 540 is connected to a network interface 542 which enables the formation of the network connection 516 with the network communication means 514. The processor means 540 is shown as further being connected to computer storage means 544 and computer memory means 546. In this example the computer storage means 544 is shown as containing the security token 518, the cryptographic server message request 520 and the cryptographic server message 522.

The computer memory means 546 is shown as containing a control module 548. The control module contains code which enables the processor means 548 to interact with the terminal means 502 to send it the cryptographic server message 522. The computer memory means 546 is further shown as containing a cryptographic module 550 and a cryptographic server message generation module 522. These two modules enable the processor 540 to respond to the security token 518 and the cryptographic server message request 520 to generate the cryptographic server message 522.

Figure 6:
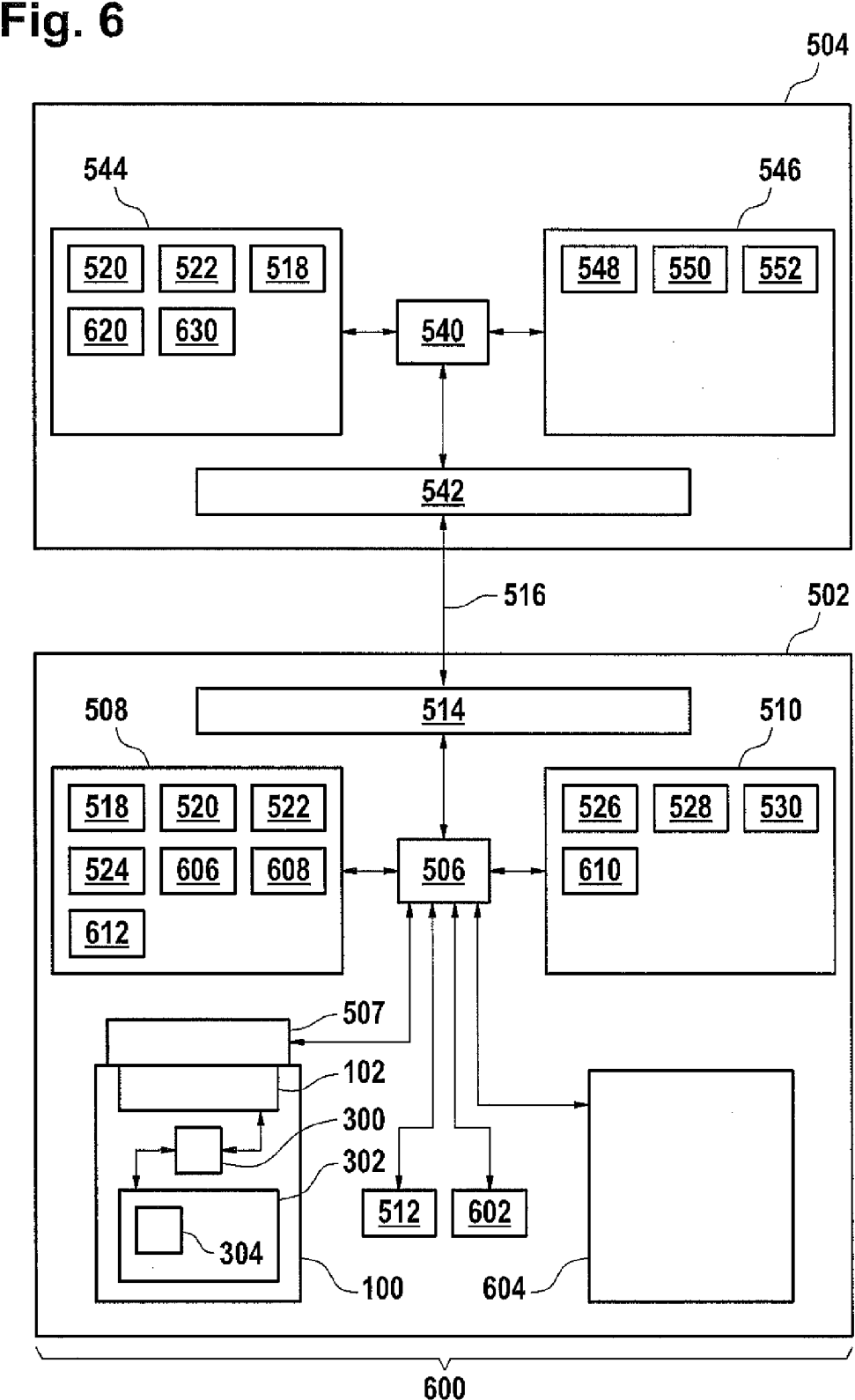
FIG. 6 shows a further example of an update system.

FIG. 6 shows a further example of an update system 600. The update system in FIG. 6 is similar to that in FIG. 5 and has many equivalent components. In addition the terminal device 502 comprises a user interface 602 and a biometric measurement system 604. The biometric measurement system 604 may for instance be a fingerprint reader and/or an iris scanner. The user interface 602 and the biometric measurement system 604 are able to communicate with the processor means 506.

The computer storage means 508 is shown as containing a biometric measurement 606 and a stored biometric measurement 608. The stored biometric measurement is optional. In some embodiments the stored biometric measurement 608 may be compared to the biometric measurement 606, If the stored biometric measurement 608 does not match the biometric measurement 606 then the process of transferring the configuration message 524 to the telecommunications chip card 100 may be aborted or stopped. The stored biometric measurement 608 may be permanently or semi-permanently stored in the storage 508 and/or it may have been transferred from the server 504 on the fly.

The computer memory means 510 is shown as containing a cryptographic token construction module 610. This module 610 is not present in all embodiments. The cryptographic token construction module 610 constructs the security token 518 at least partially using the biometric measurement 606.

The server system 504 is also modified in this example. The computer storage means 544 is shown as containing an implementation of a biometric database 620 and a subscriber database 630. When a security token 518 comprises a biometric measurement then the biometric database 620 may be used to identify which person is identified by the biometric measurement. The cryptographic server message generation module 552 may use the biometric database 620 and subscriber database 630 to construct the cryptographic server message 522.

In not all embodiments the biometric measurement system 604 and the associated biometric measurements and security token will not be present. The user interface 602 may also be used to input user data. The user data 612 may also be used by the cryptographic token construction module 610 to construct the security token 518. The user data 612 is shown as being stored in the computer storage 508.

Figure 7:
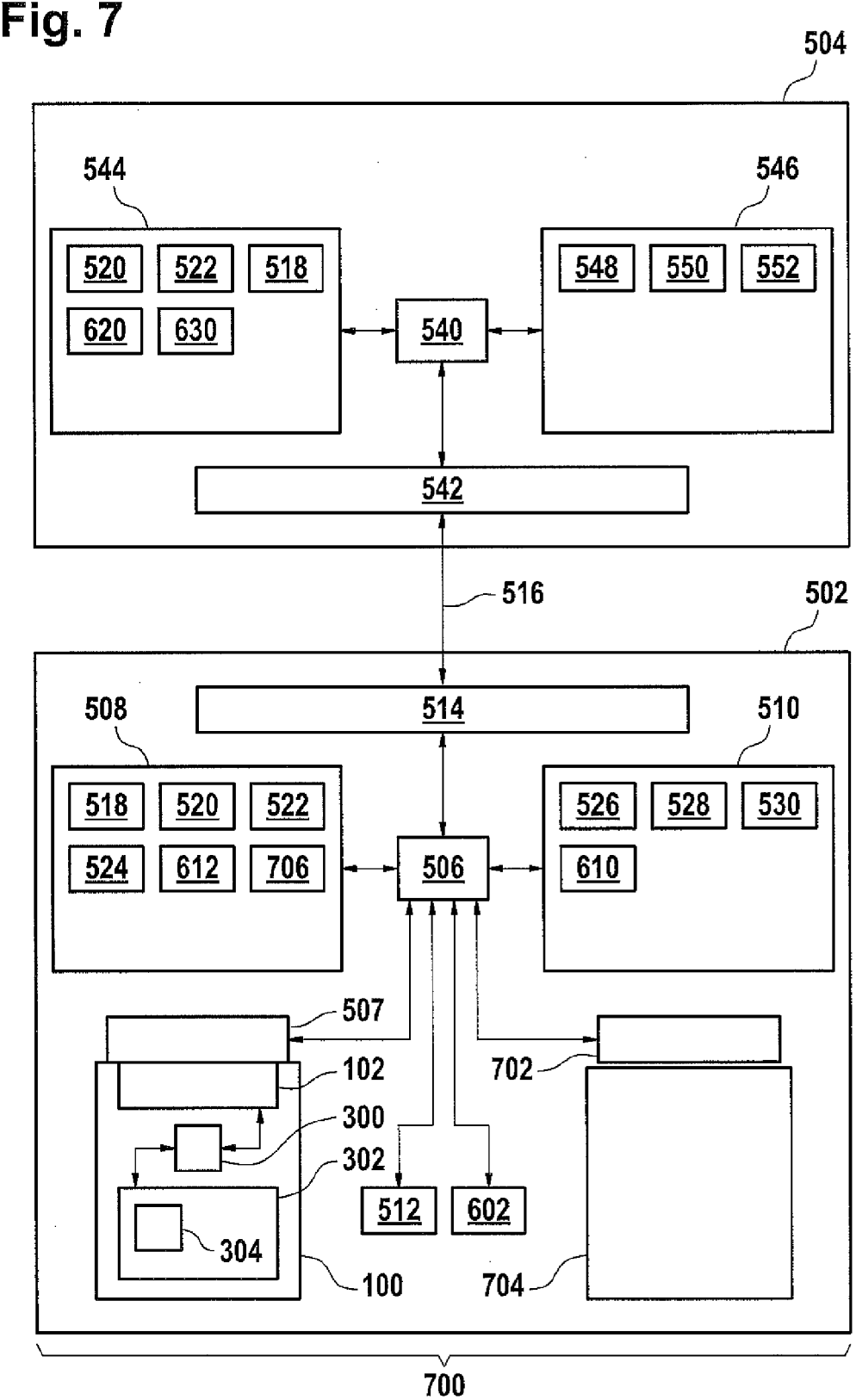
FIG. 7 shows a further example of an update system.

FIG. 7 shows a further example of an update system 700. The embodiment shown in FIG. 7 is similar to that shown in FIGS. 5 and 6. In this example there is smartcard reader 702 which is operable for interfacing with a smartcard 704. The smartcard reader 702 enables the receiving of an identity token 706 from the smartcard 704. The identity token 706 is shown as being stored in the computer storage means 508. The cryptographic token construction module 610 in this example uses the identity token 706 to at least partially construct the security token 518.

The examples shown in 5, 6 and 7 are not mutually exclusive. It is understood that the features of examples 5, 6 and 7 may be combined together.

As used herein, a CAD is Card Acceptance Device. As used herein, GPRS is a General Packet Radio Service. As used herein, GSM is a Global System for Mobile communications. As used herein, HTTPS is a Hypertext Transfer Protocol Secure. As used herein, ICCID is a Integrated Circuit Card ID. As used herein, IP is a Internet Protocol. As used herein, PIN is a Personal Identification Number. As used herein, POS is a Point Of Sale. As used herein, PPP is a Point-to-Point Protocol. As used herein, PSTN is a Public Switched Telephone Network. As used herein, SIM is a Subscriber Identity Module. As used herein, SRPS is a Secure Remote Personalization System. As used herein, SSL is a Secure Sockets Layer. As used herein, TLS is a Transport Layer Security. As used herein, TMS is a Terminal Management System.

In the race of capturing the Telecom market and cutting edge competition, there is need to increase the number of live networks by operators, increase in profiles supported by operators and improved supply chain management system to reach SIM to customer on time or available at every time.

To be in race of this cutting edge competition, SIM suppliers need to setup personalization center close to consumer market for improved supply chain management. This adds an overhead in cost in establishment of personalization center as well as its management. To overcome this problem, there is need of Low Cost, Secure and customer-oriented solution.

Embodiments of the invention may provide for an updates system or a Secure Remote Personalization System (SRPS). The SRPS may also be referred to as an update system. The SRPS may provide the following benefits:
  Low Cost Personalization and infrastructure
  Accountability of wasted ICCIDs, hence Reusability of wasted ICCIDs
  Support of multiple operators data and identification as well.
  Remote personalization using secure IP based communication via GSM, GPRS, and PSTN.
  Secure communication between SIM Card and Terminal (Point of Personalization).

1. SRPS Architecture:

The architecture may be designed keeping in mind that personalization data may be provided by a service provider in secured manner and personalization data may will reside in a Database server.

Figure 8:
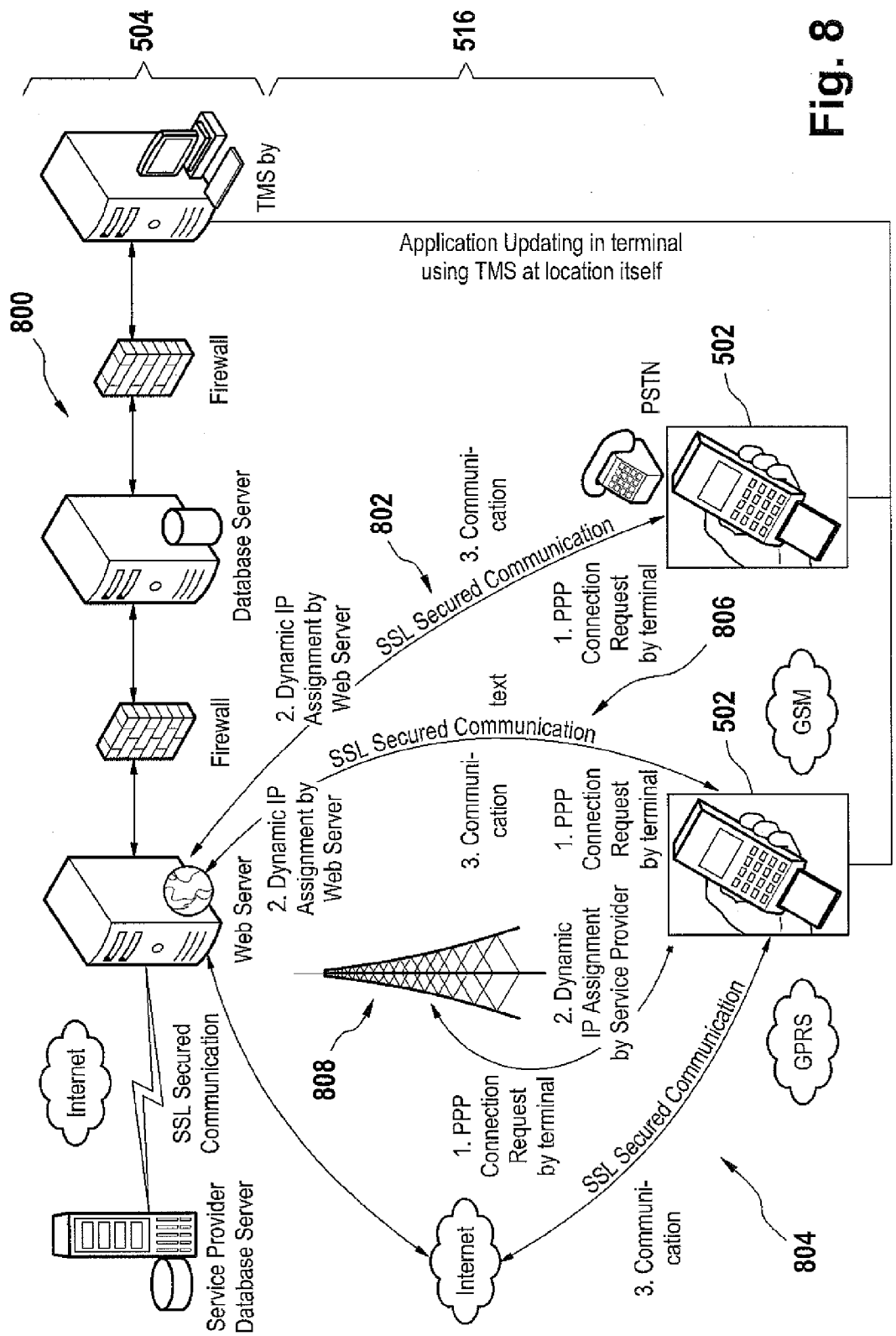
FIG. 8 shows a functional illustration of an update system.

FIG. 8 shows a functional illustration of an update system 800. Multiple computers are shown as making up a server 504. Various communications means between the server 504 and the terminal device 502 are shown. Communication between the terminal device 502 may be performed using an SSL secured connection 802 via PSTN 802, GPRS 804, or GSM 806. For the GPRS 804 and GSM 806 variants, the terminal device is assigned 808 an IP address dynamically.

SRPS can constructed in several ways:
  If Service Provider doesn't want to share their data with a company personalizing the SIM cards, a Web application can route the request from terminal to Service Provider's Database Server and response data will be sent to terminal.
  Web application can also reside at Service Provider's Server and terminal can directly request to Service Provider's Server.

The terminal device and the server may communicate in a variety of ways. For instance using:
  GPRS 804 may communicate in the following steps:
    Terminal will send a PPP request to network service provider,
    Network service provider will assign a Dynamic IP to terminal,
    Now terminal can securely communicate (for example through SSL as described below) through internet with server.
  GSM 806 or PSTN 802 may communicate in the following steps:
    Terminal will send a PPP request to Server,
    Server will assign a Dynamic IP to terminal,
    Now Web server and terminal can securely communicate (for example through SSL as described below).

The software or application which runs the terminal device may be updated using TMS.

1.1 System Components Architecture:

1.1.1. Communication Architecture:

It is possible for the operator of the digital telecommunications network and the provider of the configuration message to be different companies. In order to correctly configure the telecommunications chip card it may be beneficial to share data between the two companies.

Features of such a data sharing system may have one or more of the following features:
  Server and Service Provider's Server may communicate over SSL secured network.
  Server may import the personalization data from Service Provider's Server.
  Service Provider can access personalization report through Login and Password from Server directly.

Figure 9:
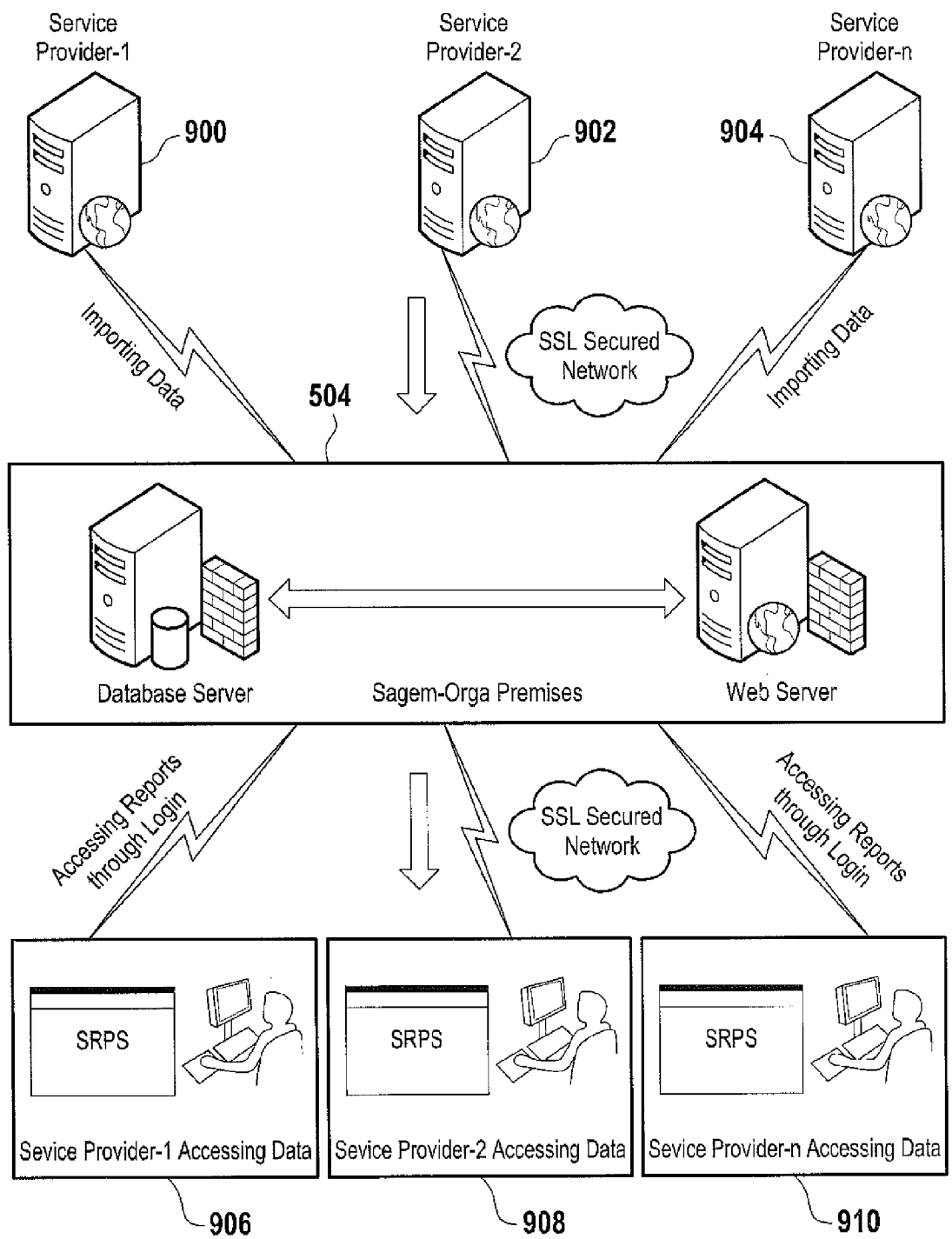
FIG. 9 shows an example of the connectivity possible between the telecommunications chip card provider and a several telecommunications service providers.

FIG. 9 shows an example of the connectivity possible between the telecommunications chip card provider and a several telecommunications service providers. 504 represents the server system of a telecommunications chip card provider. The server system 504 provides the cryptographic server message used by the terminal device to provide the configuration message.

Server 900 represents the data of a first digital telecommunications network providing company. Server 902 represents the data of a second digital telecommunications network providing company. Server 904 represents the data of a third digital telecommunications network providing company. The servers 900, 902, 904 represent three different sets of data which is provided to the server 504 for personalizing the telecommunications chip cards.

Block 906 represents a first digital telecommunications network providing company connecting to the server 504 to access data. This for instance may be for requesting the personalization of a telecommunications chip card. Block 908 represents a second digital telecommunications network providing company connecting to the server 504 to access data. Block 910 represents a first digital telecommunications network providing company connecting to the server 504 to access data.

1.1.2 TMS Architecture

Figure 10:
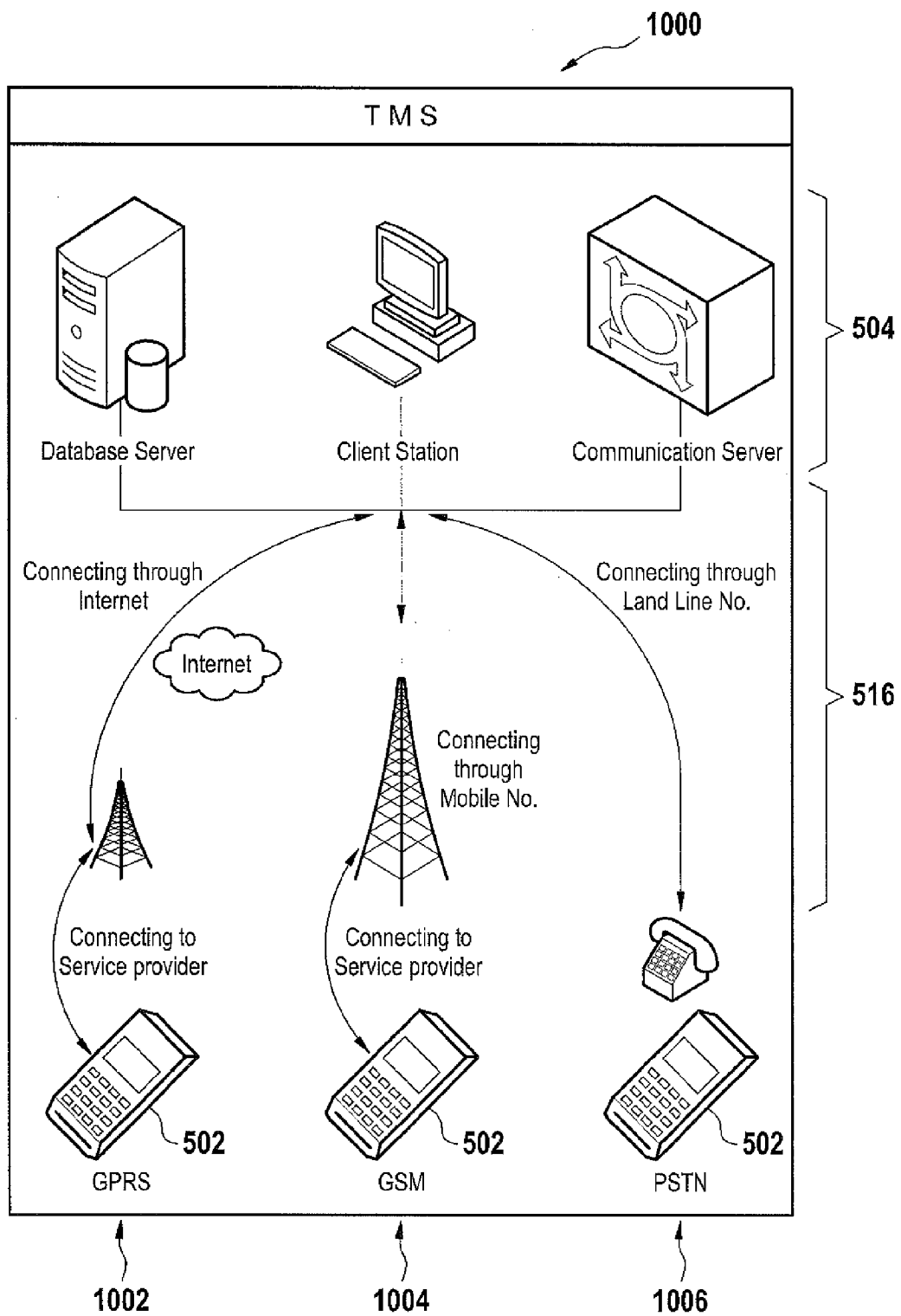
FIG. 10 Illustrates a TMS architecture for updating software on the terminal device.

FIG. 10 Illustrates a TMS architecture 1000 for updating software on the terminal device. It comprises server components 504, networking components 516, and the terminal device. A GPRS 1002, GSM 1004, and PSTN 1006 variants are illustrated.

The TMS system 1000 is a web-based system available to update the terminal application at remote location itself. New version of terminal application released can be updated by the TMS server on terminal using any available medium, i.e., GSM 1002, GPRS 1004, and PSTN 1006. TMS may be based on client-server architecture.

2. Components of the Update System 2.1 The Server or Web Server may Comprise:
  Single point of communication and
  Secure request and response mechanism using the HTTPS protocol.

Receiving Unique Serial No of Card from Terminal (i.e. Point of Personalization).

Parsing Unique Serial No.

Identification of telecom operator using Unique Serial No.

Searching and retrieving the data elements based on Unique Serial No and identified telecom operator.

Sending data elements as response to Terminal (i.e. Point of Personalization).

Updating details against Unique Serial No in database.

Routing of request to telecom Operator specific database server incase database server owned by telecom Operators.

Issuance of Terminal and its authentication.

2.2 Data-base Server

Secure Storage.

Secure accessibility.

Storing personalization data elements and profile of single or multiple telecom operators.

Abstract interface for different telecom operators.

2.3 Terminal 2.3.1 There are Several Different Methods in which a Terminal Device may Verify Ta user:

Finger Print in Terminal: Store the fingerprint of user in terminal and whenever terminal will start, it will ask for user finger print verification.

Finger Print in Smart Card: A Smart card can be issued to user with finger print in card and terminal will ask for card whenever terminal will start.

Authentication at server: User finger print will be stored at server and Terminal/Smart card. Whenever an user will try to login in the terminal application, first verification will be done at terminal and then terminal will send Finger print details to server and it will be authenticated at server also.

PIN Verification: PIN can be stored at terminal/Smart Card and whenever terminal will start, it will ask for PIN verification.

Figure 11:
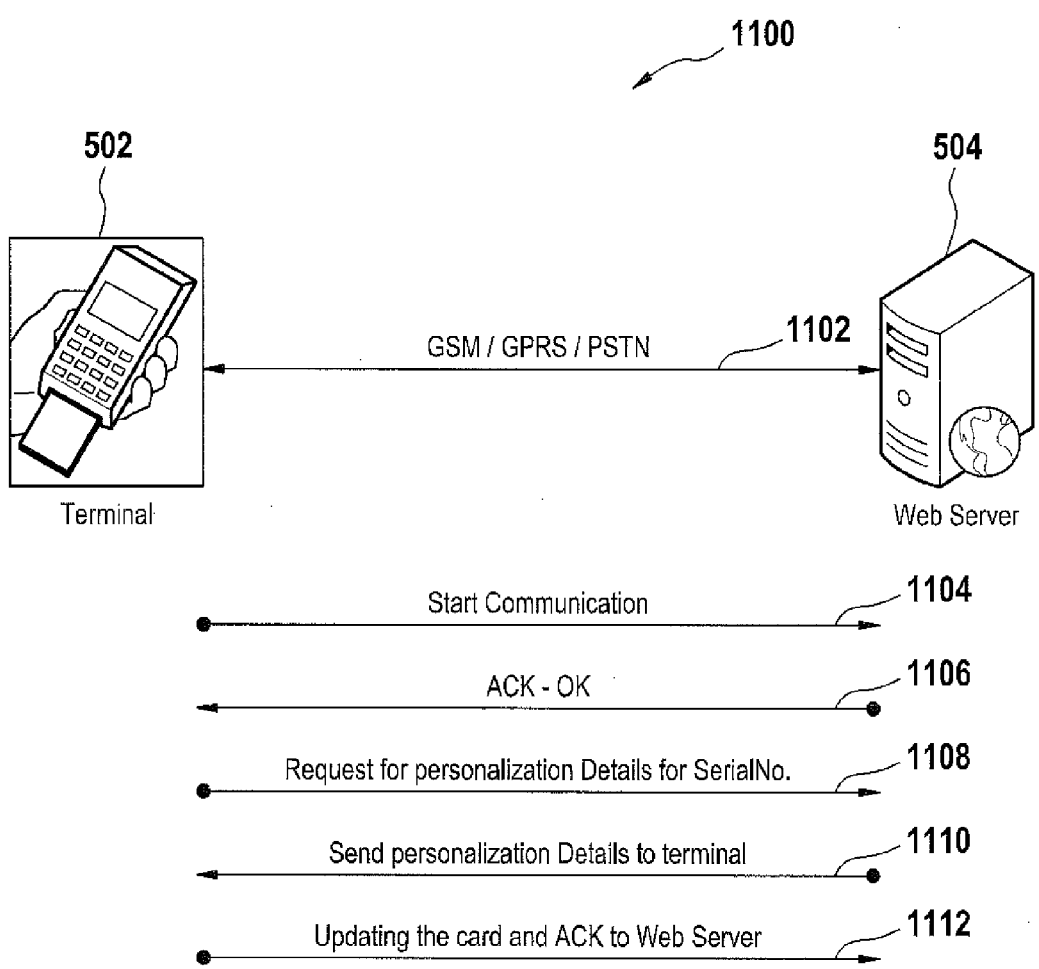
FIG. 11 illustrates a method of a communication protocol between a terminal device and a server.

2.3.2 Communication Protocol:

In some embodiments a communication protocol as shown in FIG. 11 may be used. FIG. 11 illustrates a method of a communication protocol 1100 between a terminal device 502 and a server 504. In the example shown in FIG. 11 the terminal device 502 and the server 504 may exchange data 1102 using GSM, GPRS, or PSTN. In step 1104, the terminal device 502 initiates 1104 communication with the server 504. Next in step 1106, the server 504 sends 1106 the terminal 502 an acknowledgement OK message. In step 1108. The terminal device 502 requests 1108 personalization data and a serial number for the telecommunications chip card from the server 504. In step 1110 the server 504 sends the terminal device 502 personalization details for the telecommunications chip card. The personalization details is an example of a cryptographic server message. The terminal device 502 uses the personalization details to send the configuration message to the telecommunications chip card. After completing this, the terminal device 502 sends 1112 an acknowledgement message to the server 504.

2.3.3 Mode of Personalization:

2.3.3.1 In an Embodiment the Following Steps may be Formed for Personalization Online:

Insert the SIM card into the terminal, connect to server using any available communication medium (GSM/GPRS/PSTN), download Telecom operator specific personalization data elements for as per profile supported by SIM card, perform personalization of the SIM card, and send Acknowledgement to the server.

3. Transaction Atomicity

Embodiments may have one or more of the following features to ensure that only complete updates of a telecommunications chip card is performed:

If a request sent by a terminal device and no response received from a Server a "TIMEOUT" message will be displayed on terminal.

If a request sent by terminal with a "serial number" but no corresponding record is found by the server an "INVALID SERIAL NUMBER" message, or equivalent message, will be displayed on terminal.

The terminal device may check the integrity of data received from the server.

If the terminal device is not able to update a particular file in the SIM card, the terminal device may display the personalization failure error and it will send an error code (returned by card at the time of personalization) to Server.

If the telecommunications chip card is or is not successfully updated but terminal could not send the details to server due to connection failure, the terminal will store the details locally and whenever it will be connected to the server. The unsent data will be logged and the terminal device will send the logs to the sever.

4. Security 4.1 Communication Security 4.1.1 Terminal and Card

An important aspect of any remote personalization system or update system is how to secure the communication between CAD (Card Accepting Device) and the Smart/SIM Card. This section explains some weakness of SIM and CAD communication and possible countermeasures.

4.1.1.1 Security Breaches in Smart Cards

A Smart Card and a Card Accepting Device (CAD) may communicate via means of small data packets called APDUs (Application Protocol Data Units). The following characteristics of this interaction make it harder for third parties to attack the system successfully:

Small bit rate (9600 bits per second) using a serial bi-directional transmission line (ISO standard 7816/3), half duplex mode for sending the information (data only travels in one direction at a time)

The communication follows a sophisticated protocol, described below.

However, every external device communicating with the card makes it more vulnerable to attack via the communication link.

There are also security issues related to the risk that communication between these system components, which can be monitored or scanned by hackers. I would be beneficial to develop methods improving the security of individual components and the complete update system.

The use of smart card to secure personal secure data will may be benefited by enhanced or improved cryptographic algorithms and security protocols which may be faster to execute and smaller in size looking to the space constrain on the smart card.

4.1.1.2 Security Mechanism

The Smart Card and the CAD use a mutual active authentication protocol to identify each other. The card generates a random number and sends it to the CAD, which encrypt the number with a shared encryption key before returning it to the card. The card then compares the returned result with its own encryption. The pair may then perform the operation in reverse.

Once communication is established, each message between the pair is verified through a message authentication code. This is a number that is calculated based on the data itself, an encryption key, and a random number. If data has been altered (for any reason, including transmission errors) message must be retransmitted. Alternatively, if the chip has sufficient memory and processing power, the data can be verified through a digital signature.

The selected or the active applet and the client application program (program at the terminal, which invoke the card applet application) through which the applet is communicating should take care of these data exchange.

Figure 12:
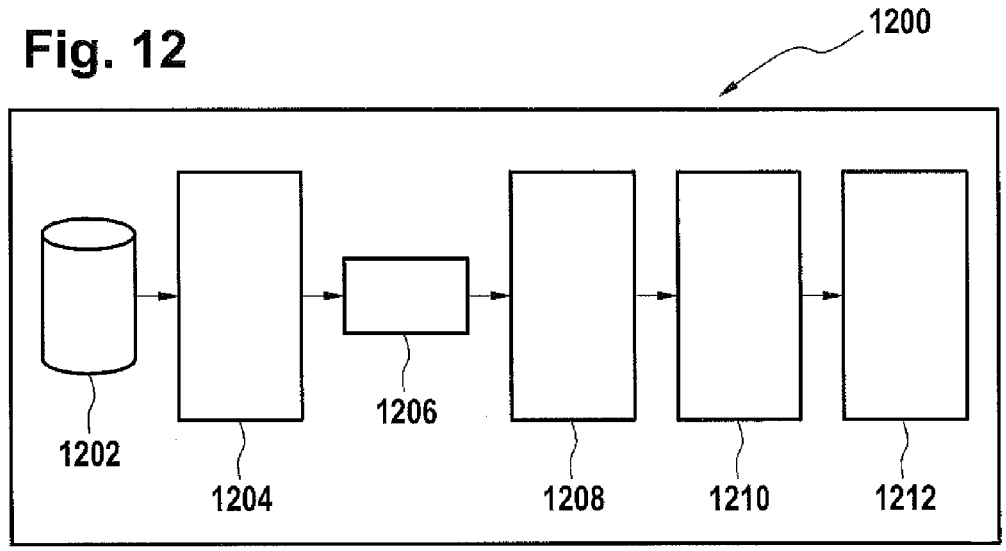
FIG. 12 illustrates a mechanism of an applet processing the update commands that are received by the terminal in encrypted form and then passed on to the applet for decryption and further processing by card Operating System.

FIG. 12 shows a flow chart which illustrates the components used to perform a method of an applet processing the update commands that are received by a terminal in encrypted form and then passed on to the applet for decryption and further processed by a card Operating System. first in block 1202 commands received from the server by terminal as an encrypted file or script. Next in block 1204 an application on the terminal prepares the chip card specific special command to be sent to a CAD (Card acceptance device)

In block 1206 processes the commands prepared in block 1204. The Card acceptance device (CAD) is basically a card interface device that performs reading and/or writing on the card on the basis of requests received from the terminal. Next in block 1208 a set of card specific special commands that are meant only for that specific card type.

Block 1210 represents a self-destroying small applet that is deciphering the encrypted commands before passing these commands to operating system. The applet will destroy, or delete, itself at the end of this process. Block 1212 represents the Card Operating System which was passed the commands by the self-destroying applet of block 1210.

Figure 13:
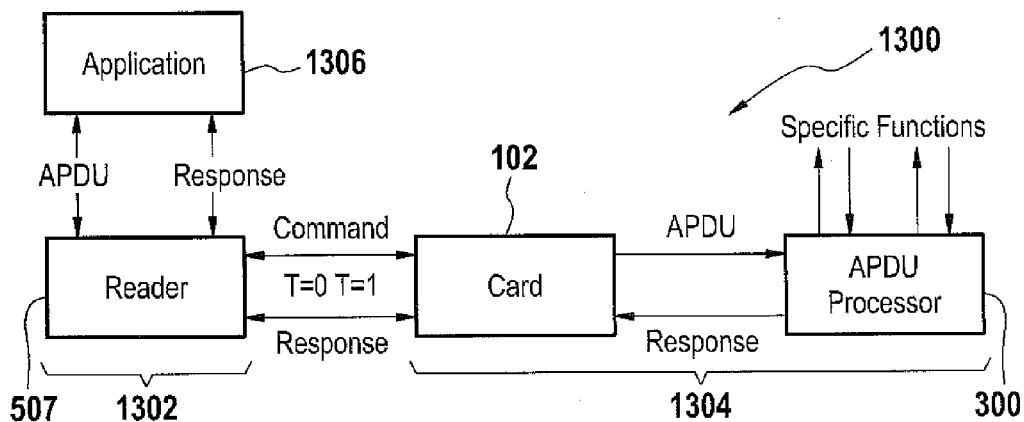
FIG. 13 illustrates a communication protocol between a terminal device and a smart card.

FIG. 13 illustrates a communication protocol 1300 between a terminal device 1302 and a smart card 1304. The smart card 1304 may be a telecommunications chip card. The terminal device 1302 has a application which sends APDU messages via a chip card reader 507 to the chip card reader interface 102. The processor means 300 functions as a APDU processor for encoding and decoding APDU messages.

4.1.1.3 Brief Description of Application

The application will support the update of record and binary file with encrypted data in secure environment on the card. Application will takes the Master Key as input at install time then it generates the Card individual key which is used to decrypt the encrypted value in applet APDU commands.

This application describes the APDU format for updating the record file and transparent file. It also defines the algorithm of unique key generation which is used by the application to decrypt the encrypted value. The same algorithm must be used by the off card application to encrypt the data for APDU command.

The Encrypted Personalization Applet application may be divided into the following modules:
1) Generation of Encryption Key
2) APDU Commands for Update Binary and Update Record
3) APDU Command for deactivating the applet.
4) APDU Command processing.

4.1.1.4 Key Generation

For the Encrypted Personalization Applet the update value comes in encrypted format. Encryption may be done using a unique format. The applet may generate a unique key for each card to decrypt the encrypted value or configuration message.

Figure 14:
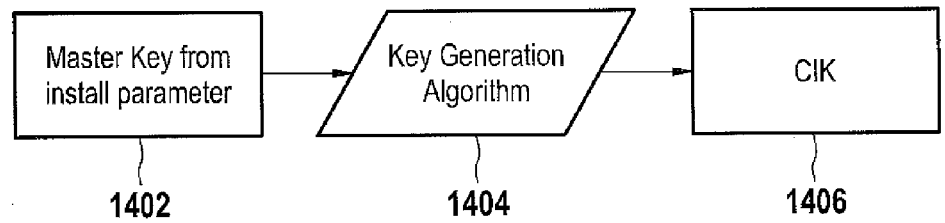
FIG. 14 shows a block diagram which illustrates a method of generating a Card Individual Key.

FIG. 14 shows a block diagram 1400 which illustrates a method of generating a Card Individual Key (CIK). The CIK is the key used by the telecommunications chip card to decrypt the configuration message. In step 1402 the applet receives a Master Key as input during installation. In step 1404 a key generation algorithm is used to produce the CIK 1406.

4.1.1.5 APDU Command Processing

When Applet receives the APDU command it check for the integrity of command. If is valid then it process the data. The applet may be operable to perform the following actions:

First it decrypts the encrypted data part.
Second it select the files in the same order in which it receives.
For update binary command it takes the offset from P1 P2 parameter in APDU command and executes the update binary command.
For Update record command it takes the record number from P1 parameter in APDU command and execute the update record command.

4.1.2 Terminal Device and Server

The terminal device may use Secure Sockets Layer (SSL) to communicate with the Server. SSL protects data transferred over hypertext transfer protocol (http) using encryption enabled by a server's SSL Certificate.

4.1.2.1 The Use of the SSL/TLS Protocol may be Advantageous because:

The use of other security protocols instead of TLS/SSL is prohibited in the scope of the POS Terminal Security Program agreement (PTS), because of the specificity of the platform, the perimeter of the PTS certification is limited to the use of the security protocol: SSL v3 or TLS 1.0 supplied by SAGEM Monetel.
If third party developers want to add a new security protocol, they will have to request for an additional PTS certification. This additional approval must be taken in charge by the third-party developers.

4.1.3 Server and Service Provider's Server

To communicate between a server providing the configuration message and a server belonging to the digital mobile telecommunications network SSL communication protocol may be used to secure the communication link between the Server and Service Provider's Server.

4.2 Data Security 4.2.1 Data Security at the Server may be Provided in the Following Ways:

Firewall may be used between the Server and network which will filter the information incoming or outgoing.
Authenticated User may gain access to the database or database schema objects and will perform authorized actions only.

4.2.2 Data Security at Terminal may be Provide in the Following Ways:

Ideally terminal may be connected during the personalization process. But if communication failure occurs then personalization status of card will be stored at terminal locally for temporary period of time.
Data stored in terminal is secured because data will remain invisible to outside world.

4.2.3 Data Security at Card may be Provide in the Following Ways:

Once the card is personalized access to the telecommunications chip card is locked so that other than GSM specific command no other command will be allowed.
Data like authentication keys and PIN are stored in the secure area of SIM card which are not accessible by APDU's.

4.3 Physical Security of Terminal and Card:
  It may be the responsibility of the terminal user to keep the terminal and card physically secured,
  The application can be secured with the security method provided (Finger Print or Password). So that only authenticated terminal user could access the application and personalize the card.

5. Disaster Recovery Management 5.1 Data Base Server:
  Disaster recovery is the process, policies and procedures related to preparing for recovery or continuation of technology infrastructure critical to an organization after a natural or human-induced disaster. To minimize the risk of disasters, the following actions may be taken:
  Backups should be performed using another physical disk as per the decided backup policy.
  Replicate the date of the server onto another database server, which overcomes the need to restore the data.
  Uninterruptible power supply (UPS) and/or backup generator to keep systems going in the event of a power failure.
  Deploy fire prevention devices such as alarms and fire extinguishers
  Use Anti-virus software and other security measures on computational devices or computers.

5.2 Terminal
  If terminal device become non-functional due to any reason then the terminal can be replaced with a new terminal and existing terminal can be sent for maintenance.

6. Appendix I 6.1 Secure Sockets Layer (SSL): How it Works
  Secure Sockets Layer (SSL) technology protects Web site and makes it easy for Web site visitors to trust in three essential ways:
  An SSL Certificate enables encryption of sensitive information during online transactions.
  Each SSL Certificate contains unique, authenticated information about the certificate owner.
  A Certificate Authority verifies the identity of the certificate owner when it is issued.

6.1.1 How Encryption Works:
  An SSL Certificate establishes a private communication channel enabling encryption of the data during transmission. Encryption scrambles the data, essentially creating an envelope for message privacy.
  Each SSL Certificate consists of a public key and a private key. The public key is used to encrypt information and the private key is used to decipher it.
  When a Web browser points to a secured domain, a Secure Sockets Layer handshake authenticates the server (Web site) and the client (Web browser). An encryption method is established with a unique session key and secure transmission can begin.

6.1.2 Certificates:
  A certificate is a digitally signed statement from an entity certifying that information about another entity is true. A certificate is an information set, signed by an issuer entity.
  The signature algorithms may be based on asymmetric key cryptography (generally RSA). The issuer entity signs by enciphering the information set with its private key (known only by itself). The other entities can verified the signature by deciphering the information set with the public key of the issuer.
  SSL uses the certificate principle to operate the authentication of the entities (client and server). These certificates are coded according to the X509 standard. This standard defines what information can contain a certificate, and describes the data format how to write it down. All X.509 certificates contain the following data, in addition to the signature: Version, Serial Number, Signature Algorithm Identifier, Issuer Name, Validity Period, Subject Name, and Subject Public Key Information.

Figure 15:
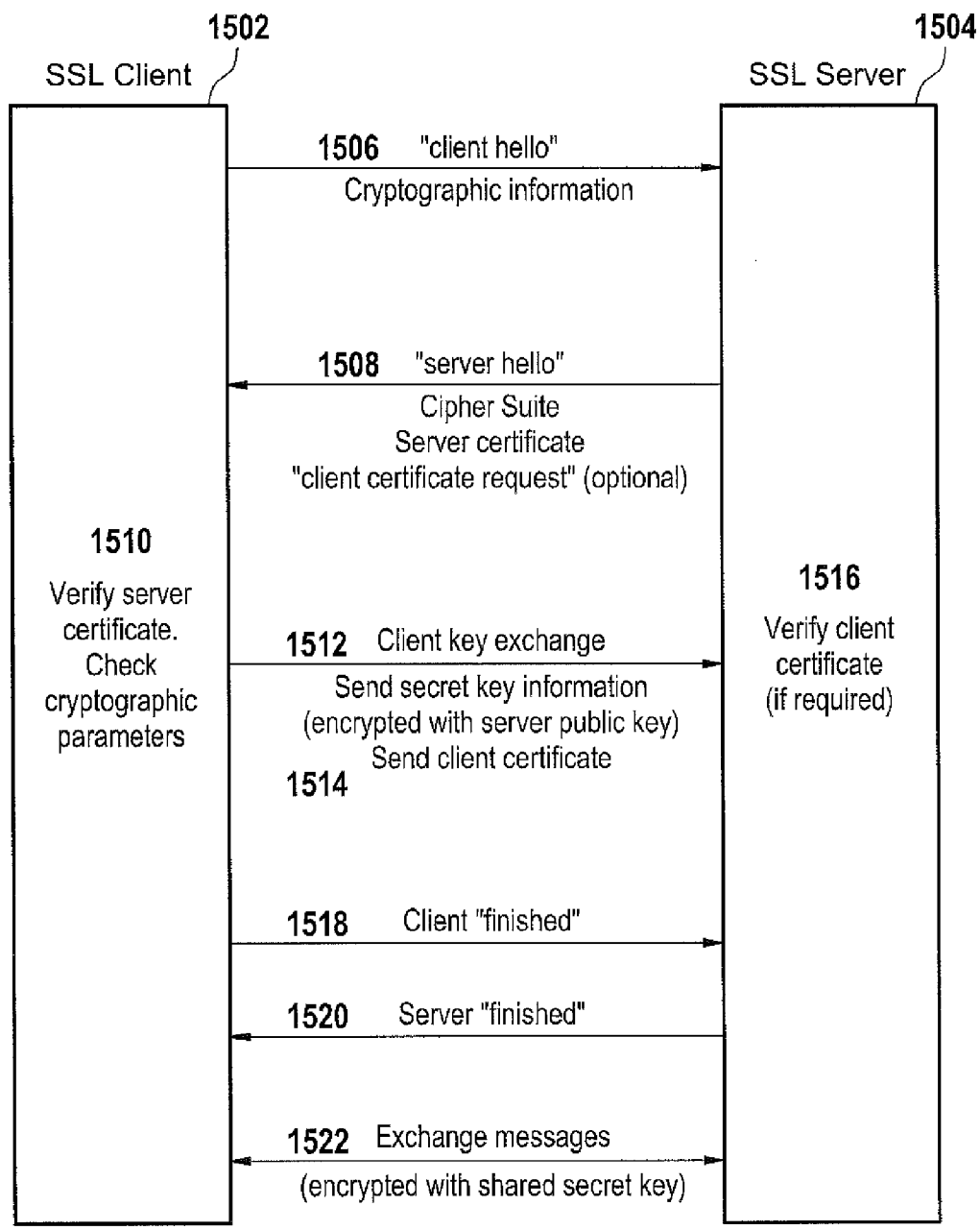
FIG. 15 illustrates a method of a SSL handshake between an SSL client and an SSL server.

6.1.3 SSL Handshake.
  FIG. 15 illustrates a method 1500 of a SSL handshake between an SSL client 1502 and an SSL server 1504:
  The SSL client 1502 sends 1506 a "client hello" message that lists cryptographic information such as the SSL version and, in the client's order of preference, the Cipher Suites supported by the client. The message also contains a random byte string that is used in subsequent computations. The SSL protocol allows for the "client hello" to include the data compression methods supported by the client, but current SSL implementations do not usually include this provision.
  The SSL server 1504 responds 1508 with a "server hello" message that contains the Cipher Suite chosen by the server from the list provided by the SSL client 1502, the session ID and another random byte string. The SSL server 1504 also sends its digital certificate. If the server requires a digital certificate for client authentication, the server sends a "client certificate request" that includes a list of the types of certificates supported and the Distinguished Names of acceptable Certification Authorities (CAs).
  The SSL client 1502 verifies 1510 the digital signature on the SSL server's digital certificate and checks that the Cipher Suite chosen by the server 1504 is acceptable.
  The SSL client 1502 sends 1512 the random byte string that enables both the client 1502 and the server 1504 to compute the secret key to be used for encrypting subsequent message data. The random byte string itself is encrypted with the server's public key.
  If the SSL server 1504 sent a "client certificate request", the SSL client 1502 sends 1514 a random byte string encrypted with the client's private key, together with the client's digital certificate, or a "no digital certificate alert". This alert is only a warning, but with some implementations the handshake fails if client authentication is mandatory.
  The SSL server 1504 verifies 1516 the signature on the client certificate.
  The SSL client 1502 sends 1518 the SSL server 1504 a "finished" message, which is encrypted with the secret key, indicating that the client part of the handshake is complete.
  The SSL server 1504 sends 1520 the SSL client 1502 a "finished" message, which is encrypted with the secret key, indicating that the server part of the handshake is complete.
  For the duration of the SSL session, the SSL server 1504 and SSL client 1502 can now exchange 1522 messages that are symmetrically encrypted with the shared secret key.

6.1.4 Basis Requirements for SSL:
  For the terminal, the PKI framework imposes some requirements for the SSL profile definition, mainly to be compliant the PTS Program agreement:
  Only the algorithms: 3DES and AES must be used for encryption of the SSL/TLS session
  The minimum length of the 3DES or AES keys must be at least 128 bits.
  Authentication method must use RSA or DSS algorithms. The length of the public keys must be at least 1024.

Only the SHA-1 hash algorithm must be used. The use of MD5 is prohibited.

The mutual authentication is recommended but not mandatory.

LIST OF REFERENCE NUMERALS 100 telecommunications chip card
102 chip card reader interface
104 mobile telephone device
106 chip card reader
107 digital cellular mobile telecommunications network
108 radio link
110 base station
112 radio network controller
114 telecommunications network
300 chip card processor means
302 secure memory means
304 program
400 subscriber information
402 telephone numbers
404 operating system
406 advertisement
408 first application
410 second application
500 update system
502 terminal device
504 server
506 terminal device processor means
507 chip card reader
508 computer storage means
510 computer memory means
512 cryptographic module means
514 network communications means
516 network connection
518 security token
520 cryptographic server message request
522 cryptographic server message
524 configuration message
526 control module
528 cryptographic, mutual authentication module
530 cryptographic module
540 server processor means
542 network communications means
544 computer storage means
546 computer memory means
548 control module
550 cryptographic module
552 cryptographic server message generation module
600 update system
602 user interface
604 biometric measurement system
606 biometric measurement
608 stored biometric measurement
610 cryptographic token construction module
612 user data
620 biometric database
630 subscriber database
700 update system
702 smart card reader
704 smart card
706 identity token
800 update system
802 PSTN
804 GPRS
806 GSM
808 dynamic IP assignment
900 server
902 server
904 server
906 access to server
908 access to server
910 access to server
1000 telecommunications management system
1002 GPRS
1004 GSM
1006 PSTN
1100 communication protocol
1200 update system
1202 script
1204 terminal application
1206 CAD
1208 CMD
1210 interpreter application
1212 card operating system
1300 communication protocol
1400 method of key generation
1500 method of SSL handshake
1502 SSL client
1504 SSL server

The invention claimed is:

1. An update system for modifying a chip card, the update system comprising:
a terminal device, wherein the terminal device comprises:
a chip card reader operable for receiving the chip card and for exchanging data via a chip card reader interface, wherein the chip card comprises a chip card processor;
a terminal device processor;
a terminal memory for storing a terminal program, wherein an execution of the terminal program causes the terminal device processor to:
perform a first cryptographic mutual authentication between the terminal device and the chip card via the chip card reader interface;
perform a second cryptographic mutual authentication between the terminal device and a computer;
send a cryptographic security token to the computer;
request a cryptographic message from the computer;
receive the cryptographic message from the computer;
decrypt the cryptographic message using a cryptographic key;
construct a configuration message using the decrypted cryptographic message;
send the configuration message to the chip card via the chip card reader interface.

2. The update system of claim 1, wherein the terminal device comprises a finger print reader for scanning a finger print.

3. The update system of claim 2, wherein the terminal device further comprises a memory for storing finger print records, wherein the execution of the terminal program causes the terminal processor to verify the finger print by comparing the finger print to the finger print records, and wherein the execution of the terminal program causes the terminal processor to abort the request for the cryptographic message unless the finger print is verified.

4. The update system of claim 3, wherein the cryptographic security token comprises the finger print.

5. The update system of claim 1, further comprising:
a smart card reader operable for interfacing with a smart card, wherein the execution of the terminal program causes the terminal processor to:

perform a cryptographic validation of the smart card, wherein the request for the cryptographic message is aborted unless a finger print is verified.

6. The update system of claim 5, wherein the smart card comprises a smart card memory containing an identity token comprising at least one of: a stored finger print data, a biometric data, an iris scan data, a cryptographic authentication data, or any combinations thereof.

7. The update system of claim 1, wherein the terminal device further comprises a user interface, wherein the execution of the terminal program causes the terminal processor to receive user data from the user interface, and wherein the cryptographic security token comprises the user data.

8. The update system of claim 1, further comprising the computer.

9. A method of configuring a chip card using an update system, the method comprising:
performing a first cryptographic mutual authentication between a terminal device and the chip card using a chip card reader interface;
performing a second cryptographic mutual authentication between the terminal device and a server;
sending a cryptographic security token from the terminal device to the server;
sending a cryptographic server message request from the terminal device to the server;
sending a cryptographic server message from the server to the terminal device;
decrypting the cryptographic server message using a cryptographic key;
constructing a configuration message using the decrypted cryptographic server message;
sending the configuration message from the terminal device to the telecommunications chip card;
storing the configuration message in a secure memory; and
deleting a program from the secure memory,
wherein the chip card comprises:
the chip card reader interface adapted for allowing a communication between the chip card and a mobile telephone device,
a chip card processor;
the secure memory for storing programs for execution by the chip card processor; and
the program, and
wherein the terminal device comprises:
the chip card reader for receiving the chip card and for exchanging data with the chip card reader interface.

10. The method of claim 9, further comprising identifying a subscriber using the cryptographic security token.

11. The method of claim 10, wherein the security token comprises a biometric identifier for identifying the subscriber based on a comparison of the biometric identifier to data in a biometric database.

12. A device comprising:
a housing;
a reader configured to read a chip card comprising a first processor; a second processor coupled to the reader;
a memory coupled to the second processor, wherein the housing comprises the reader, the second processor and the memory, wherein the memory stores a set of instructions which instruct the second processor to perform a method, wherein the method comprises:
performing a first cryptographic mutual authentication between the second processor and the chip card;
performing a second cryptographic mutual authentication between the second processor and a computer;
sending a cryptographic security token to the computer;
requesting a cryptographic message from the computer; receiving the cryptographic message from the computer; decrypting the cryptographic message via a cryptographic key;
constructing a first configuration message via the cryptographic message based at least in part on the decrypting;
sending the first configuration message to the first processor, wherein the first processor is unable to at least one of receive, save, or execute a second configuration message, wherein the second configuration message is sent to the first processor after the first configuration message.

13. An update system for modifying a chip card, the update system comprising:
a terminal device, wherein the terminal device comprises:
a chip card reader operable for receiving the chip card and for exchanging data via a chip card reader interface;
a terminal device processor;
a terminal memory for storing a terminal program, wherein an execution of the terminal program causes the terminal device processor to:
perform a first cryptographic mutual authentication between the terminal device and the chip card via the chip card reader interface;
perform a second cryptographic mutual authentication between the terminal device and a computer;
send a cryptographic security token to the computer;
request a cryptographic message from the computer;
receive the cryptographic message from the computer;
decrypt the cryptographic message using a cryptographic key to generate a decrypted cryptographic server message;
construct a first configuration message using the decrypted cryptographic server message;
send the first configuration message to the chip card via the chip card reader interface, wherein the chip card is unable to at least one of receive, save, or execute a second configuration message, wherein the second configuration message is sent to the chip card after the first configuration message.

* * * * *